(12) United States Patent
Zwiegincew

(10) Patent No.: US 12,099,635 B1
(45) Date of Patent: Sep. 24, 2024

(54) OPAQUE BOUND VARIABLES

(71) Applicant: META PLATFORMS TECHNOLOGIES, LLC, Menlo Park, CA (US)

(72) Inventor: Arthur Zwiegincew, Medina, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 308 days.

(21) Appl. No.: 17/558,258

(22) Filed: Dec. 21, 2021

(51) Int. Cl.
```
G06F 9/48      (2006.01)
G06F 9/455     (2018.01)
G06F 15/16     (2006.01)
G06F 21/62     (2013.01)
H04L 15/16     (2006.01)
H04L 29/06     (2006.01)
H04L 29/08     (2006.01)
```

(52) U.S. Cl.
CPC ........ G06F 21/629 (2013.01); G06F 21/6209 (2013.01); *G06F 2221/2113* (2013.01); *G06F 2221/2141* (2013.01)

(58) Field of Classification Search
CPC .............. G06F 21/629; G06F 21/6209; G06F 2221/2113; G06F 2221/2141
USPC .......................................................... 726/27
See application file for complete search history.

(56) References Cited

U.S. PATENT DOCUMENTS

| | | | |
|---|---|---|---|
| 10,560,662 B1 * | 2/2020 | Tippana | H04L 65/1069 |
| 10,896,031 B2 * | 1/2021 | Cimadamore | G06N 5/01 |
| 11,416,239 B2 * | 8/2022 | Zwiegincew | G06F 16/128 |
| 2003/0046316 A1 * | 3/2003 | Gergic | G06F 9/451 |
| | | | 715/255 |
| 2004/0199516 A1 * | 10/2004 | Thames | G06F 8/71 |
| 2005/0278790 A1 * | 12/2005 | Birk | G06F 21/54 |
| | | | 726/26 |

(Continued)

OTHER PUBLICATIONS

Mauro Conti , "OASIS: Operational Access Sandboxes for Information Security" Nov. 7, 2014, ACM Oasis: . . . , ACM, 2 Penn Plaza, Suit 701 New York NY 10121-0701 USA, Nov. 7, 2014 (Nov. 7, 2014), pp. 105-110.*

(Continued)

*Primary Examiner* — Emmanuel L Moise
*Assistant Examiner* — Berhanu Shitayewoldetadik
(74) *Attorney, Agent, or Firm* — Potomac Law Group PLLC; Dannon Allbee

(57) ABSTRACT

In one embodiment, a computing system executes an application defining a bound variable that references a bound value. The bound value references computation instructions to derive a corresponding current value of the bound variable and the application lacks access permission to the current value of the bound variable. An operating system of the computing system receives a request to perform an operation that references the bound variable. The operating system identifies, based on computation instructions, one or more services separate from a process running the application to process the computation instructions referenced by the bound value. At least one of the one or more services has access permission to the current value of the bound variable. The operating system computes, using the one or more identified services, the current value of the bound variable according to the computation instructions of the bound value.

20 Claims, 6 Drawing Sheets

(56) References Cited

U.S. PATENT DOCUMENTS

| | | | | |
|---|---|---|---|---|
| 2006/0282681 | A1* | 12/2006 | Scheidt | G06F 21/602 |
| | | | | 713/186 |
| 2008/0071801 | A1* | 3/2008 | Lucco | G06F 16/9027 |
| 2008/0071802 | A1* | 3/2008 | Lucco | G06F 40/143 |
| 2009/0217163 | A1* | 8/2009 | Jaroker | G06F 8/60 |
| | | | | 717/174 |
| 2011/0078665 | A1* | 3/2011 | Gulwani | G06F 11/302 |
| | | | | 707/E17.039 |
| 2012/0023149 | A1* | 1/2012 | Kinsman | G06F 7/38 |
| | | | | 708/204 |
| 2012/0266000 | A1* | 10/2012 | Maheshwari | G06F 21/6218 |
| | | | | 713/189 |
| 2015/0089637 | A1* | 3/2015 | Centonze | H04L 63/102 |
| | | | | 726/21 |
| 2017/0039353 | A1* | 2/2017 | James | G06F 21/10 |
| 2017/0206597 | A1* | 7/2017 | Bunnell | G06Q 20/10 |
| 2017/0220352 | A1* | 8/2017 | Woo | G06F 9/3001 |
| 2018/0268130 | A1* | 9/2018 | Ghosh | G06F 21/53 |
| 2019/0236293 | A1* | 8/2019 | Goodridge | H04L 63/105 |
| 2019/0251294 | A1* | 8/2019 | Goodridge | G06F 21/6281 |
| 2020/0311025 | A1* | 10/2020 | Singh | G06F 11/1004 |
| 2022/0206778 | A1* | 6/2022 | Zwiegincew | G06F 8/65 |
| 2022/0342830 | A1* | 10/2022 | Chen | G06F 12/1441 |

OTHER PUBLICATIONS

Conti; et al., "OASIS: Operational Access Sandboxes for Information Security," Proceedings of the 4th ACM Workshop on Security and Privacy in Smartphones Mobile Devices, Nov. 7, 2014, pp. 105-110.

International Search Report and Written Opinion for International Application No. PCT/US2022/053678, mailed Apr. 26, 2023, 9 pages.

Jana; et al., "A Scanner Darkly: Protecting User Privacy from Perceptual Applications," IEEE Symposium on Security and Privacy, May 19, 2013, pp. 349-363.

* cited by examiner

OPAQUE BOUND VARIABLES

TECHNICAL FIELD

This disclosure generally relates to an application framework used in an operating system.

BACKGROUND

Traditional operating systems may have defined application lifecycles, where processes start, the processes do work on one or more threads, and then the processes exit. In this case of traditional operating systems, the application user interface and work items do not outlive the process. Additionally, there may be power consumption concerns and privacy concerns associated with the traditional operating systems, especially in the context of an augmented reality (AR)/virtual reality (VR) device.

SUMMARY OF PARTICULAR EMBODIMENTS

Disclosed herein is an application framework may use opaque bound variables to obfuscate data from non-trusted applications. Data privacy may be a concern when people use applications. As such, not all applications should be able to access sensitive data of users. This may be especially true for an augmented reality (AR)/virtual reality (VR) device given that an AR/VR device may capture images of a user's environment. Therefore, an application framework to prevent application access to sensitive data may be used to address this concern. This application framework may use opaque bound variables so applications may still perform processes on variables, but not necessarily have access to the data contained in the opaque bound variables. As an example and not by way of limitation, if an application would like to generate a birthday crown to apply to any friends in view of the AR/VR device that has a birthday, then the application would need several sensitive information that users may not want to share with the application. The sensitive information or sensitive data may include a user's birthday, a set of active faces, user identifiers, and the like.

In particular embodiments, the application framework may allow applications to process opaque bound variables that correspond to the sensitive information and sensitive data. In particular embodiments, to do so, developers may code opaque bound variables similarly to non-opaque variable. Additionally, the application may use one or more services that may process the opaque bound variables. The services may be trusted services that have access to the underlying information/data stored in the opaque bound variables. The services may be provided by the operating system of the computing system. The services may then process the opaque bound variables to return an output. In the instance of implementing a birthday crown, an application may use a face tracker, a user identifier, and a social graph to process bound variables. The face tracker may be a service that exposes a set of active faces as a bound variable. The user identifier may access a user identification to identify one or more users. The social graph may be a dataset that may be inner-joined with the user identification dataset. Additionally, a chrono service may also expose various time-related components to further obfuscate data that applications have access to. By separating out what data that applications have access to, this application framework may prevent applications from unnecessarily accessing sensitive data.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
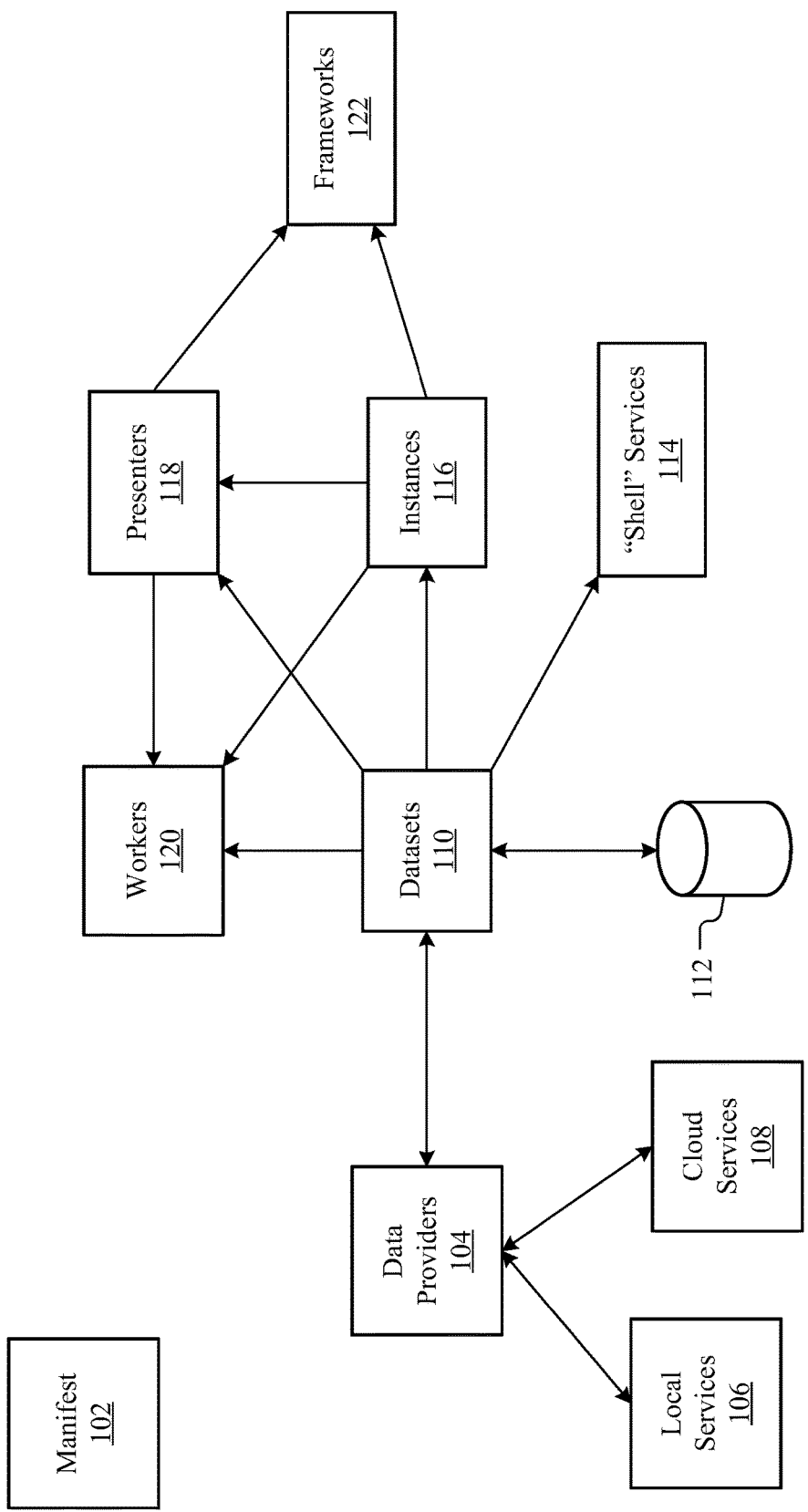
FIG. 1 illustrates an example operating system environment associated with a computing system.

In particular embodiments, an application framework may use opaque bound variables to obfuscate data from non-trusted applications. Data privacy may be a concern when people use applications. As such, not all applications should be able to access sensitive data of users. This may be especially true for an augmented reality (AR)/virtual reality (VR) device given that an AR/VR device may capture images of a user's environment. Therefore, an application framework to prevent application access to sensitive data may be used to address this concern. This application framework may use opaque bound variables so applications may still perform processes on variables, but not necessarily have access to the data contained in the opaque bound variables. As an example and not by way of limitation, if an application would like to generate a birthday crown to apply to any friends in view of the AR/VR device that has a birthday, then the application would need several sensitive information that users may not want to share with the application. The sensitive information or sensitive data may include a user's birthday, a set of active faces, user identifiers, and the like.

In particular embodiments, the application framework may allow applications to process opaque bound variables that correspond to the sensitive information and sensitive data. In particular embodiments, to do so, developers may code opaque bound variables similarly to non-opaque variable. Additionally, the application may use one or more services that may process the opaque bound variables. The services may be trusted services that have access to the underlying information/data stored in the opaque bound variables. The services may be provided by the operating system of the computing system. The services may then process the opaque bound variables to return an output. In the instance of implementing a birthday crown, an application may use a face tracker, a user identifier, and a social graph to process bound variables. The face tracker may be a service that exposes a set of active faces as a bound variable. The user identifier may access a user identification to identify one or more users. The social graph may be a dataset that may be inner-joined with the user identification dataset. Additionally, a chrono service may also expose various time-related components to further obfuscate data that applications have access to. By separating out what data that applications have access to, this application framework may prevent applications from unnecessarily accessing sensitive data.

In particular embodiments, the code of a software application may use bound values to reference bound variables. The bound values may be opaque lazy recipes of the current value of the bound variable. The bound variables may behave as ordinary variables locally, with mutation functions for changing the underlying values. The bound value may be a lazy abstraction, or a recipe, for obtaining snapshots and update streams. Bound values may track the versions of the bound variables and provide it to a requestor as a snapshot. In addition, a requestor may also request an update stream from the received snapshot, which allows the requestor to automatically receive updates. Bound values may track versions of bound variables via snapshots, and specific snapshots may be retrieved using corresponding snapshot version numbers.

In particular embodiments, the application framework may have several layers, including a computation declaration layer and a computation orchestration layer. The computation declaration layer may provide developers with implementations of bound variables, bound values, bound functions, and various pre-defined types of bound data models, such as scalars, maps, lists, etc. The computation declaration layer may also allow users to define custom types of bound values, which are referred to as bound transforms or bound functions. A bound transform may be a custom instance of a bound value abstraction having a specified type and custom implementation details for providing a snapshot and update stream. A snapshot may be a value of the bound value at a particular instance. An update stream may be a series of values corresponding to a bound value. The computation declaration layer may operate on top of the computation orchestration layer, which may manage data subscriptions between the bound values/transforms/functions and the underlying data stream. A data subscription may indicate one or more subscribers to a data stream that receives updates to the data stream. In addition, the computation orchestration layer may support snapshots and update streams of bound values. When the user code (application developer code) is compiled, the subscription relationships and snapshot utilization can be reasoned on and the resulting data structures and data flow could be optimized accordingly.

In particular embodiments, a user's code may use the computation declaration layer to specify how live data is to be consumed (e.g., how a particular value stored in a bound map data structure is to be displayed). When the code is compiled, the compiler may optimize the runtime logic to make the data-binding data flow more efficient. This may manifest in the computation orchestration layer instantiating more efficient data subscriptions and usage of data structures to support, e.g., snapshots (e.g., if the user code does not make use of the different snapshots of a bound value, no complex data structure would be instantiated to track different data versions). At runtime, when the underlying data stream updates a bound value, the computation orchestration layer may identify all the subscribers and trigger their callback functions defined within the computation declaration layer. Those callback functions may specify the logic for handling updates to the bound value. As an example and not by way of limitation, the callback function of a bound function for summation may request for the latest snapshot and the snapshot's mutation update stream. A mutation update stream may provide a history of incremental value changes, which allows the callback function to incrementally compute the updated summation value. As an example and not by way of limitation, if the current summation value is the sum of 1M numbers, normally the change in a single number would require a re-computation of the sum or an explicit "diff" operation between the underlying 1M numbers to find what has changed. Here, however, the mutation update stream may provide a tracked history of what has changed since the last snapshot (e.g., values deleted or added). Thus, the summation callback function could easily recompute the summation value in response to a changed number by, e.g., subtracting the previous value of the number from the current sum and adding the new value of the number (e.g., if the previous sum is 2,273,222 and one of the 1M numbers changed from 3 to 2, the new sum could be computed by: 2,273,222-3+2).

In particular embodiments, each of the bound values may correspond to a data stream that provides information to functions that may be subscribed to the data stream. As an example, the bound value may be defined as a variable "X". When the variable X is used in functions, the function may be determined to be subscribed to the data stream corresponding to the variable X. The computation orchestration layer may generate a mapping between the bound values and the subscribers to the data stream. That is, the computation orchestration layer may determine which functions may need to subscribe to a particular data stream and which functions need to be propagated the changes to the respective data stream. This mapping may be a subscriber tree. Therefore, if a function includes a bound value X, such as X+Y=Z, and Z is used in a different function, then the computation orchestration layer may also add functions that include the value Z as a subscriber to the data stream of the bound value X. The computation orchestration layer may also perform an optimization to reduce unnecessary data structures. The stream library may comprise the data streams that functions subscribe to. When a data stream is updated, the stream library may propagate the data change to the necessary functions. By using bound values, the data changes may be propagated without errors and without an application having access to the data.

As mentioned herein, certain technical challenges may exist for traditional operating systems. One technical challenge may include privacy concerns of applications during normal operation of the application. The solution presented by the embodiments disclosed herein to address this challenge may be to utilize opaque bound variables. By using opaque bound variables, applications may be prevented from accessing the sensitive data of the users. The applications may use services provided by an operating system to process the underlying data associated with opaque bound variables. These trusted services help in further separating the sensitive data from the applications, but allow the applications to still use the data.

Certain embodiments disclosed herein may provide one or more technical advantages. A technical advantage of the embodiments may include improved data privacy of the user. Certain embodiments disclosed herein may provide none, some, or all of the above technical advantages. One or more other technical advantages may be readily apparent to one skilled in the art in view of the figures, descriptions, and claims of the present disclosure.

In particular embodiments, a computing system execute an application. The computing system may be embodied as one or more of a smartphone, laptop, desktop, AR/VR headset, or another computing system. The computing system may execute an application that is stored or installed on the computing system. As an example and not by way of limitation, a user of the computing system may select to open a messaging application. The computing system may execute the messaging application to open the messaging application. In particular embodiments, the application may define one or more bound variables, each of the bound variables may reference a corresponding bound value. A bound value may reference computation instructions to derive a corresponding current value of the bound variable. In particular embodiments, the application may define a terminating bound value that references other computation instructions for deriving a runtime value from at least the bound value of the bound variable. The runtime value may be a current value of the terminating bound value. In particular embodiments, the application may lack access permission to the current value of the bound variable. As an example and not by way of limitation, a bound variable may reference data corresponding to a user's social graph. The social graph may not be accessed by the application. In particular embodiments, the bound value may be embodied as one of a plurality of data types. The plurality of data types may include one or more of a scalar, struct, enum, option, set, ordered set, map, multimap, ordered map, ordered multimap, list, indexed set, or data set. In particular embodiments, the computing system may initialize a snapshot tracker for tracking a history of values of a bound value. In particular embodiments, the computing system may add an update to the snapshot tracker in response to receiving an update to the bound value. In particular embodiments, the computing system may index the added update to the bound value using a snapshot identifier. Although this disclosure describes executing an application in a particular manner, this disclosure contemplates executing an application in any suitable manner.

In particular embodiments, an operating system of a computing system may receive a request to perform an operation. The operating system of the computing system may receive a request to perform an operation that references the bound variable from the application. As an example and not by way of limitation, the application may request to generate one or more birthday crowns to apply as an augmented reality element on a user or as a virtual reality element to apply to a user's avatar. In particular embodiments, the operation may reference other bound variables. Although this disclosure describes receiving a request to perform an operation in a particular manner, this disclosure contemplates receiving a request to perform an operation in any suitable manner.

In particular embodiments, the operating system of the computing system may identify one or more services to process the computation instructions referenced by the bound value. In particular embodiments, the operating system may use the computation instructions to identify one or more services to process the computation instructions referenced by the bound value. In particular embodiments, the operating system may use the computation instructions referenced by other bound values to identify the one or more services to process the respective computation instructions. As an example and not by way of limitation, if the bound value is directed to camera data, the one or more services identified may be a camera service to access camera data (e.g., one or more images). In particular embodiments, the one or more services may be separate from a process running the application. In particular embodiments, the one or more services may have access permission to the current value of the bound variable. The separation of the one or more services from the process running the application may help to prevent the application from access any data that is processed by the one or more services. In particular embodiments, the each of the one or more services may have a first privilege level different from a second privilege level of the application. The first privilege level may provide permission to access the current value of the bound variable. In particular embodiments, the one or more services may comprise one or more of a user identifier, a social graph, a chronological service, and the like. Although this disclosure describes identifying one or more services in a particular manner, this disclosure contemplates identifying one or more services in any suitable manner.

In particular embodiments, the operating system of the computing system may compute the current value of the bound variable. In particular embodiments, the operating system may use one or more of the identified services to compute the current value of the bound value according to the computation instructions of the bound value. As an example and not by way of limitation, if the computation instructions specify using a social graph to compute the current value of the bound variable, then the operating system may access a dataset associated with the social graph of the user using a data provider. In particular embodiments, computing the current value may comprise retrieving a particular snapshot identifier. In particular embodiments, the computed current value may comprise one or more of a user identification, a social connection between a first user and a second user, and time-related data. Although this disclosure describes computing the current value of the bound variable in a particular manner, this disclosure contemplates computing the current value of the bound variable in any suitable manner.

In particular embodiments, the operating system of the computing system may perform the operation using the computed current value. The operating system may generate an output by performing the operation using the computed current value. In particular embodiments, the output may be one or more of a visual output or an audio output. As an example and not by way of limitation, a visual output may be a birthday crown applied to a user as an augmented reality element. In particular embodiments, the computing system may present the output via one or more of a display of the computing system or one or more speakers of the computing system. Although this disclosure describes performing an operation in a particular manner, this disclosure contemplates performing an operation in any suitable manner.

In particular embodiments, an operating system of a computing system may include one or more components. In particular embodiments, the operating system may include an application instance manager, a presentation manager, and other components described herein. The operating system may use these components to manage applications. The computing system may be embodied as one or more of a smartphone, laptop, desktop, AR/VR headset, or another computing system. In particular embodiments, the operating system of the computing system may determine, using an application instance manager, that a first instance corresponding to a first application is to be activated according to an instance database managed by the operating system. In particular embodiments, the first application may comprise a plurality of application components (e.g., a presenter, an instance, a data provider, a worker, and the like). Although this disclosure describes determining that an instance corresponding to an application is to be activated in a particular manner, this disclosure contemplates determining that an instance corresponding to an application is to be activated in any suitable manner.

In particular embodiments, the operating system of the computing system may invoke a first instance and a first presenter. In particular embodiments, the operating system may use an application instance manager to invoke a first instance, where the first instance may manage the first presenter. In particular embodiments, the application instance manager may invoke one or more other instances, each of the instances may manage a respective presenter. In particular embodiments, the operating system may use the application instance manager to determine that a second instance corresponding to a second application is to be activated according to the instance database. The operating system may use the application instance manager to invoke the second instance and its corresponding components, such as a data provider. In particular embodiments, one or more instances may be invoked in parallel. The operating system may use the instance database and application instance manager to determine whether an instance needs to be invoked and/or shut down. If the application instance manager determines to shut down an instance, the application instance manager may shut down an instance while allowing other components of an application to continue running. As an example and not by way of limitation, the application instance manager may shut down an instance of an application, but a data provider of the application may continue to run after the instance is shut down. Although this disclosure describes invoking an instance in a particular manner, this disclosure contemplates invoking an instance in any suitable manner.

In particular embodiments, the operating system of the computing system may determine that a first presenter is configured to present data obtained by a data provider. In particular embodiments, the data provider may be one of a plurality of application components of a second application. As an example and not by way of limitation, the application may include a data provider, an instance, a worker, a presenter, and other application components. Although this disclosure describes determining a presenter is configured to present data in a particular manner, this disclosure contemplates determining a presenter is configured to present data in any suitable manner.

In particular embodiments, the operating system of the computing system may access data from a data store using a data provider. In particular embodiments, the operating system of the computing system may use the data provider to access data from a data store and populate a dataset defined by a second application. In particular embodiments, the operating system may use the data provider to access data from a second data store and populate the dataset defined by the second application. As an example and not by way of limitation, the data provider may access data of a certain category to populate the dataset defined by the second application. The operating system may identify data stores associated with the certain category and use the data provider to access the identified data stores. Although this disclosure describes accessing data from a data store in a particular manner, this disclosure contemplates accessing data from a data store in any suitable manner.

In particular embodiments, the operating system of the computing system may generate a user interface to present the data from the dataset defined by the second application. In particular embodiments, the operating system of the computing system may use the first presenter of the first application to generate a user interface to present the data from the dataset defined by the second application. In particular embodiments, the one or more instances may be used to manage one or more presenters to present data from one or more data providers in one or more user interfaces. As an example and not by way of limitation, the operating system may use one or more instances to manage one or more presenters to present data from one or more data providers in one or more user interfaces. In particular embodiments, the operating system may use a presentation manager to arrange one or more user interfaces based on predefined settings and user settings. As an example and not by way of limitation, a user may define a viewing space and where to place one or more user interfaces corresponding to different applications and the operating system. In particular embodiments, the operating system may use the presentation manager to close one of the one or more user interfaces based on predefined settings and user settings. Although this disclosure describes generating a user interface in a particular manner, this disclosure contemplates generating a user interface in any suitable manner.

Referring to FIG. 1, an example operating system environment 100 associated with a computing system is shown. In particular embodiments, the example operating system environment 100 may include an application decomposed into component parts. In particular embodiments, the operating system environment 100 may comprise an application manifest 102, one or more data providers 104, one or more local services 106, one or more cloud services 108, one or more datasets 110, one or more databases 112, one or more shell services 114, one or more instances 116, one or more presenters 118, one or more workers 120, and one or more frameworks. Although a particular number and configuration of component parts of the environment 100 is shown, this disclosure contemplates different configurations of the component parts including additional or removal of parts. As an example and not by way of limitation, workers 120 may be coupled to the frameworks 122. Different components of the environment 100 may serve as a client, while other components of the environment may serve as a server. In particular embodiments, instances 116 may serve as a client, where presenters 118, workers 120, and frameworks 122 are servers. In particular embodiments, presenters 118 may serve as a client, where workers 120 and frameworks 122 serve as a server. In particular embodiments, the datasets 110 may be a source and shell services 114, instances 116, and presenters 118, and workers 120 may be sinks. While connections between certain components are shown in a particular manner, the connections may be replaced with different connections. As an example and not by way of limitation, workers 120 may be a client and instances 116 may be a server. In particular embodiments, datasets 110 may be a developer-defined managed entity. As an example and not by way of limitation, the datasets 110 may be managed and defined by a developer of an application. In particular embodiments, data providers 104, instances 116, presenters 118, and workers 120 may be developer-defined roles. As an example and not by way of limitation, the data providers 104, instances 116, presenters 118, and workers 120 may be roles defined by a developer of an application. In particular embodiments, shell services 114 and frameworks 122 may be system components of the operating system. In particular embodiments, the application manifest 102 may be embodied as application metadata needed by different parts of the system. In particular embodiments, the application manifest may be an entry point into the application and may be a declarative entity that is common across all applications. In particular embodiments, the application manifest 102 may be an enumeration of one or more implemented types of instances, presenters, workers, and data providers and their required parameters. In particular embodiments, the application manifest 102 may be a specification of required capabilities for each of the instances, presenters, workers, and data providers.

In particular embodiments, datasets 110 may be sources of data in the operating system. The read side of a dataset 110 may be a declarative query (e.g., SQL queries) and may allow the operating system to control the lifecycle of downstream roles based on data updates. The write side of a dataset 110 from the perspective of downstream consumers may be a set of mutation methods. Datasets 110 may enable the operating system to reason about data flow and apply declarative patterns throughout. As an example and not by way of limitation, in the interest feed, the existence of augment instances can be declaratively tied to the presence of a data item in a dataset 110. The datasets 110 may need to conform to a dataset model specific to the application framework described herein. In particular embodiments, datasets 110 may be embodied as one or more of an interest feed, set of contacts, calendar, application specific datasets, tracker/recognizer sets (e.g., the set of empty walls nearby), and system state dataset. In particular embodiments, the datasets 110 may be embodied as an opaque bound variable.

In particular embodiments, data providers 104 may be code behind datasets 110. In particular embodiments, Data providers 104 and datasets 110 may have a 1:N relationship. In particular embodiments, data providers 104 may populate datasets 110 and keep them up-to-date. As an example and not by way of limitation, data providers 104 may sync the datasets 110 with cloud sources. Data providers 104 may be configured to implement mutations on datasets 110. In particular embodiments, data providers 104 may run in the background and/or run when datasets 110 are consumed by active instances 116, presenters 118, and workers 120. In particular embodiments, only data providers 104 use a specific cloud data pipeline may run in the background and other data providers 104 may run only when datasets are consumed by active instances 116, presenters 118, and workers 120. In particular embodiments, data providers 104 may be embodied as one or more of a cloud storage provider, face tracker/recognizer, assistant, microphone, local key value (KV) store, local filesystem, an application data provider, and the like. Other embodiments of data providers 104 may be considered.

In particular embodiments, workers 120 may be arbitrary non-user interface processes that may be needed for instances 116 and presenters 118 to function. Workers 120 may provide an escape hatch. The workers 120 may provide security bulkheads for different internal parts of an application that may not be related to user interaction. In particular embodiments, a worker 120 may be embodied as one or more of a raytracing rendered for a 3D modeling app, chess engine in a chess engine, and the like. Other embodiments of workers 120 may be considered.

In particular embodiments, instances 116 may manage the state and lifecycle of an application instance. The instances 116 may switch among available presenters 118 based on dataset 110, worker 120, and presenter 118 state changes. In particular embodiments, instances 116 may have different privilege levels. Instances 116 with higher privilege levels may create additional instances of various types. In particular embodiments, instances 116 may manage serialization of an application state. In particular embodiments, instances 116 may be restricted to have no network access, have no user interface, and have no storage other than mediated access. Special permissions for particular instances 116 may be required to create additional instances 116 and to be always active. These special permissions may be assigned by an administrator. Instances 116 with special permissions may access data associated with an opaque bound variable.

In particular embodiments, presenters 118 may implement graphical, voice-based, tactile, or other user interfaces. In particular embodiments, presenters 118 may be hierarchically composed, allowing for various forms of cross-application integration. Presenters 118 may include metadata-based restrictions that allow the operating system to request and enforce no-distraction UIs. The operating system may kill one or more presenters 118 without a handshake. In particular embodiments, presenters 118 may have no network access. In particular embodiments, presenters 118 may have metadata-based restrictions to impose restrictions on the presenters 118 based on determined metadata. In particular embodiments, presenters 118 may be embodied as one or more of a share intent target chooser, login view, conversation view, conversation list view, photo application thumbnail view, photo application image editor, voice interface, codec, augmentation, and the like. Other embodiments of presenters 118 may be considered. In particular embodiments, presenters 118 with special permissions may access data associated with an opaque bound variable.

In particular embodiments, shell services 114 may include one or more of an application launcher, a context manager, a window manager, a notification manager, and the like. The shell services 114 may be a group of privileged system processes that may perform special actions. The shell services 114 may include first party services and third party services.

In particular embodiments, frameworks 122 may include libraries of the operating system. In particular embodiments, frameworks 122 may include system services that provide functionality such as UI rendering, audio, and the like.

In particular embodiments, the one or more components of environment 100 may run concurrently. Each role (e.g., data provider 104, instance 114, presenter 118, and worker 120) of the environment 100 may be implemented purely declaratively, through a virtual machine, and through native processes. Some components of the environment 100 may be running in the cloud, while other may be running on the computing system. As an example and not by way of limitation, data providers 104 and workers 120 may be running in the cloud.

Figure 2:
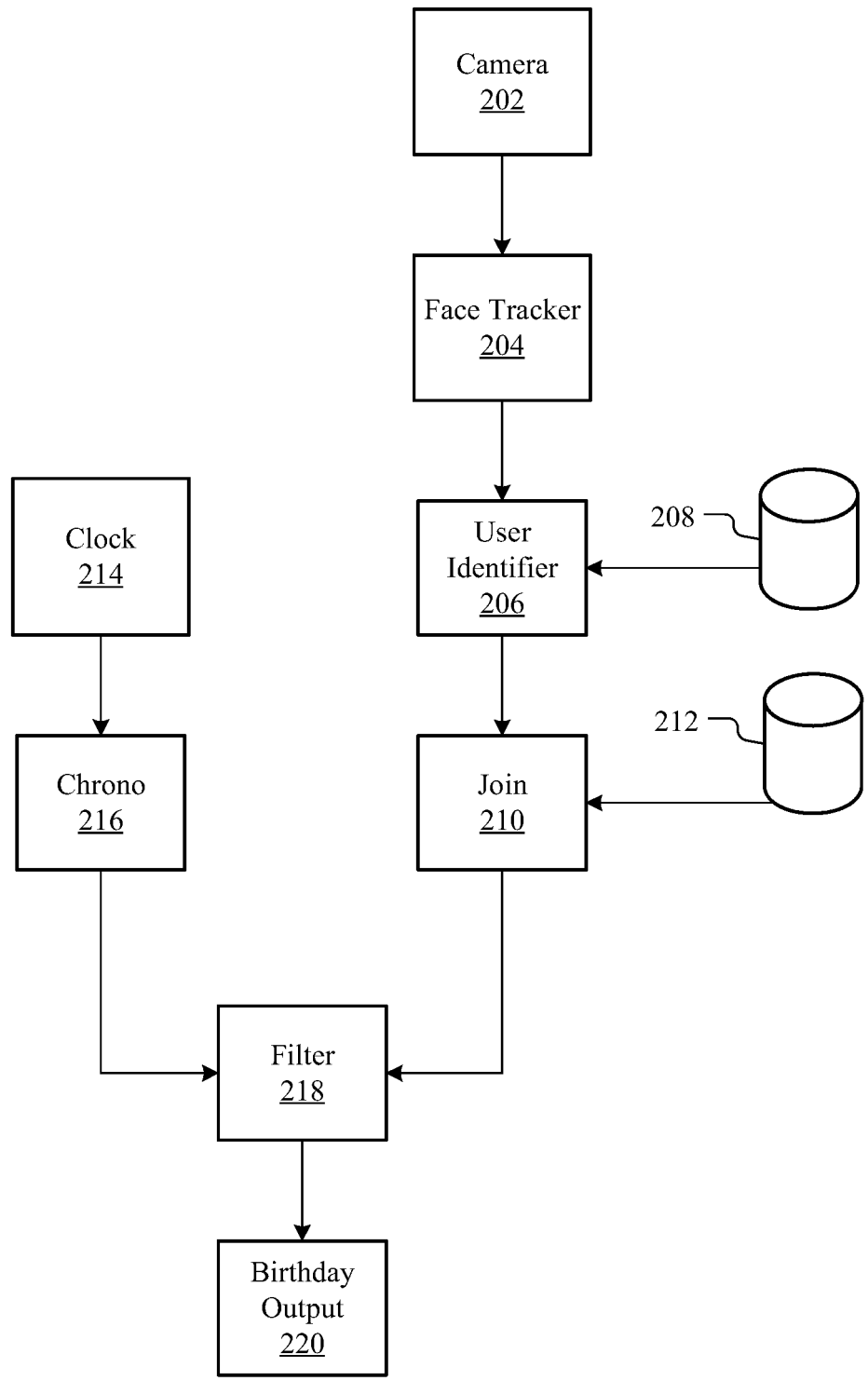
FIG. 2 illustrates another example operating system environment.

Referring to FIG. 2, another example operating system environment 200. The environment 200 may include a camera 202, face tracker 204, user identifier 206, user identification database 208, join function 210, social graph database 212, clock 214, chrono service 216, filter 218, and birthday output 220. While a particular configuration and number of components of environment 200 is shown, this disclosure contemplates any suitable configuration and different number of components of environment 200. As an example and not by way of limitation, there may be two or more cameras 202. Additionally, while certain components of environment 200 is shown, this disclosure contemplates other configurations of components to generate other outputs. As an example and not by way of limitation, the environment 200 may include a global positioning system (GPS) tracker, which may be used to generate an output to show where a user is on a map interface. In particular embodiments, the environment 200 may include one or more hardware components, such as camera 202 and clock 214. In particular embodiments, the environment 200 may include one or more services, such as face tracker 204, user identifier 206, join function 210, chrono service 216, and a filter 218. In particular embodiments, the environment 200 may include one or more outputs, such as birthday output 220.

In particular embodiments, the operating system of a computing system may receive a request to perform an operation from an application as described herein. The operation may reference one or more bound variables needed to perform the operation. In particular embodiments, for a birthday crown generating process, the application may request to perform an operation that references bound variables corresponding to a user identification database 208, a social graph database 212, data from the camera 202, and data from the clock 214. The operating system may identify the one or more services that are separate from a process running the application to process the computation instructions referenced by the bound values corresponding to the bound variables. The identified services may include the face tracker 204, the user identifier 206, the join function 210, the chrono service 216 and the filter 218 to process the computation instructions referenced by the bound values. As an example and not by way of limitation, if the data of the camera 202 is represented by a bound variable, the face tracker 204 may have access permission to the data of the camera 202. For instance, the face tracker 204 may access the images that are captured by the camera 202. The face tracker 204 may be configured to process the images captured by the camera 202 to identify the shape of the user's face. In particular embodiments, the face tracker 204 may identify the boundaries of the user's face (e.g., top of the user's head, cheeks, chin, and the like). In particular embodiments, the camera 202 may capture the features of the images to send to the face tracker 204, such as where a user's face is located in the image.

In particular embodiments, the face tracker 204 may send data to the user identifier 206 to identify a corresponding user in the image captured by the camera 202. To do so, there may be a user identification associated with each person in an image captured by the camera 202. As an example and not by way of limitation, a user's device (e.g., AR/VR headset) may indicate to other devices (who have permission to receive the information) that the device corresponds to a particular user. The user identifier 206 may access a dataset corresponding to a user identification database 208 to associate the user's device and the corresponding person to a particular user identification. As an example and not by way of limitation, if a user's device (e.g., AR/VR headset) indicates that the user is John Smith, then the user identifier 206 may access the user identification database 208 to associate the correct John Smith with the user device. By using the face tracker 204 and the user identifier 206, the operating system may associate the shape of a face to a particular user identification. The output of the user identifier 206 may be a user identification associated with a shape of face in an image.

In particular embodiments, the operating system may use a join function 210 between the output of the user identifier 206 and the social graph database 212 to identify a specific attribute of the person. In particular embodiments, the join function 210 may be configured to identify user's birthday information from the social graph database 212. The output of the join function 210 may be the image captured by the camera 202 and metadata associated with a shape of a face in the image, the metadata indicating a user identification and birthday of the user. The metadata may also simply indicate a birthday of the user. The join function 210 may send the output to the filter 218. In particular embodiments, the chrono service 216 may access data from the clock 214 to determine a current date and time. The chrono service 216 may send the current date to the filter 218. In particular embodiments, the filter 218 may use the current date from the chrono service 216 to filter out which user's have a birthday on the current date. The filter 218 may identify the shapes of faces in an image that have birthdays on the current date. The filter 218 may send the identified shapes of faces to the birthday output 220.

In particular embodiments, the birthday output 220 may be configured to apply a birthday crown on a person as an augmented reality element or a virtual reality element. As an example and not by way of limitation, the computing system may be an AR device, where a birthday crown may be applied to a person in view of the user of the AR device. The birthday output 220 may receive the shape of a user's face associated with a birthday and identify the boundaries of the user's face based on the shape to properly fit a birthday crown output to the user's head. In particular embodiments, the computing system may be a VR device, where the birthday crown may be applied to a user's avatar. The computing system may simply add a birthday crown to the user's avatar. In particular embodiments, the operating system may use an instance to initiate the one or more services (e.g., face tracker 204, user identifier 206, join function 210, chrono service 216, and filter 218) to process the data from different datasets (e.g., data from camera 202, user identification database 208, social graph database 212, and data from clock 214) that may be populated by one or more data providers. The operating system may use a presenter to present the birthday output 220.

Figure 3:
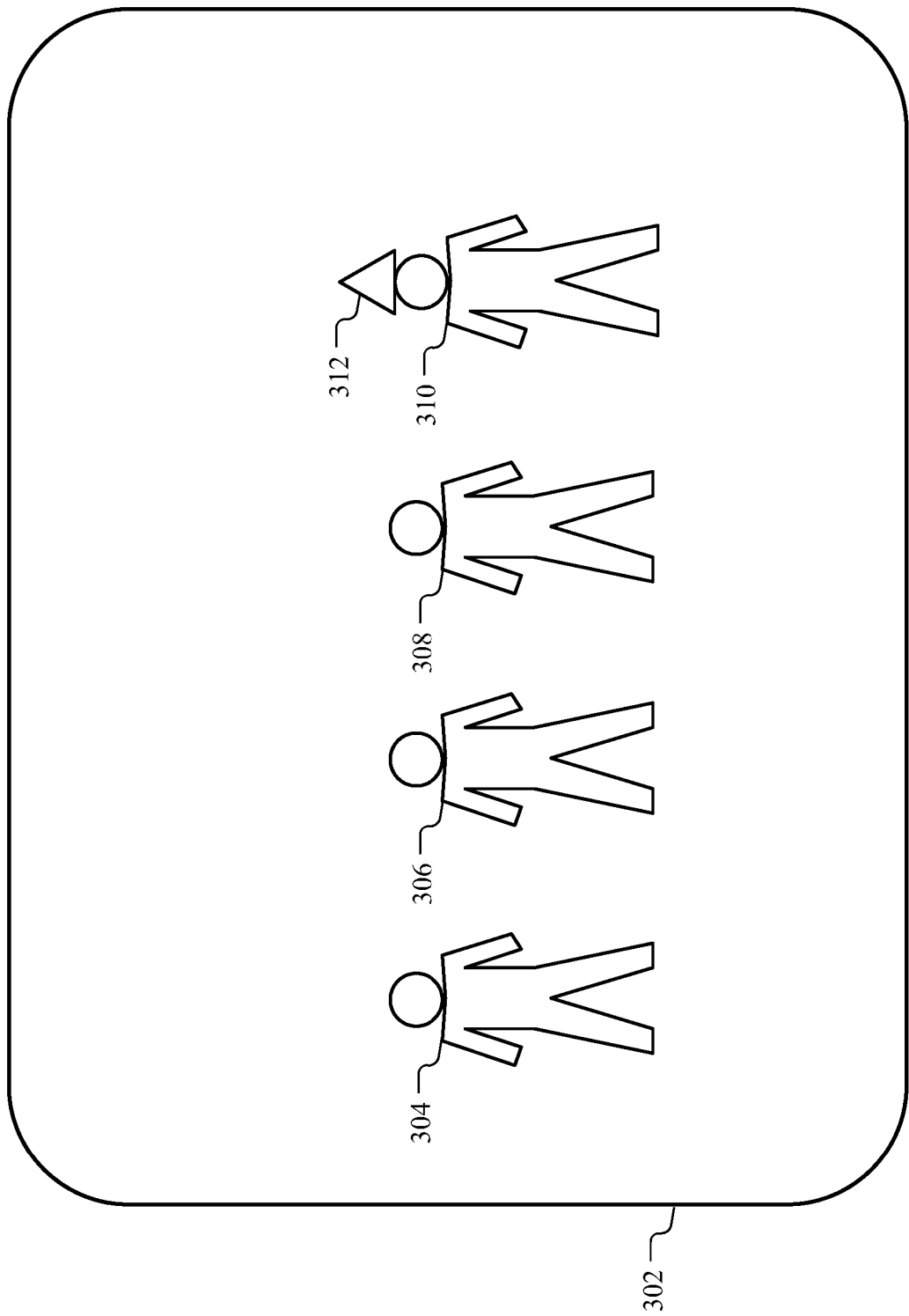
FIG. 3 illustrates an example view of an augmented reality environment.

Referring to FIG. 3, an example view 302 of an augmented reality environment 300 is shown. The environment 300 may include multiple people 304, 306, 308, and 310. A user wearing an AR device may have the view 302 of the environment 300. The user may have an application running that is able to apply birthday crowns on people that have been identified as having a birthday on a current date. In particular embodiments, the user may enable the application to generate birthday crowns on people in the view 302 who have a birthday on the current date. In particular embodiments, the application may send a request to perform an operation as described herein. The operating system of the AR device may proceed to identify users who have a birthday on the current date and apply a birthday crown 312 on the identified users. In particular embodiments, the operating system may identify that the user 310 has a birthday on the current date. The operating system may present a birthday crown 312 on top of the user 310 to indicate it is user 310's birthday.

Figure 4:
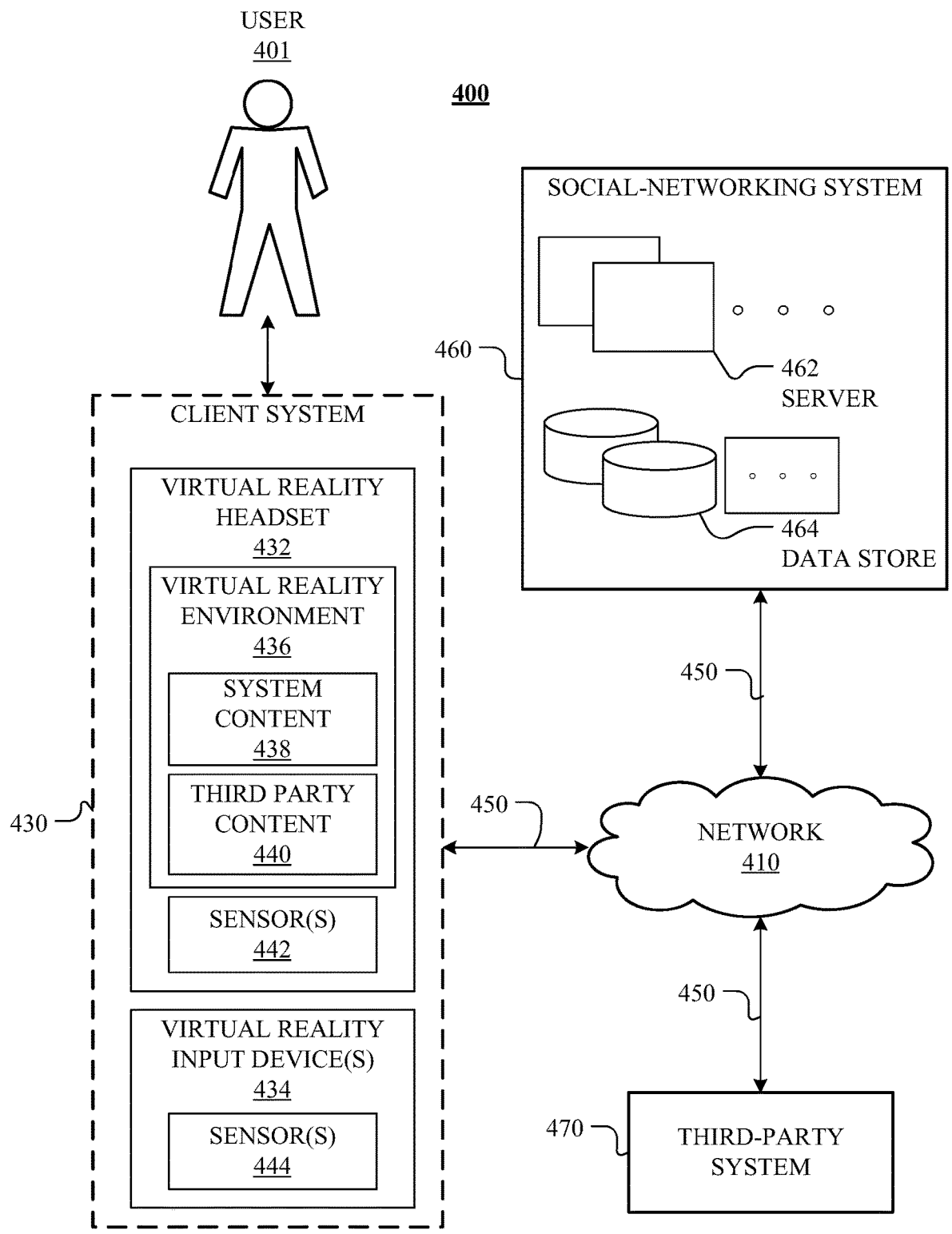
FIG. 4 illustrates an example network environment associated with a virtual reality system.

FIG. 4 illustrates an example network environment 400 associated with a virtual reality system. Network environment 400 includes a user 401 interacting with a client system 430, a social-networking system 460, and a third-party system 470 connected to each other by a network 410. Although FIG. 4 illustrates a particular arrangement of a user 401, a client system 430, a social-networking system 460, a third-party system 470, and a network 410, this disclosure contemplates any suitable arrangement of a user 401, a client system 430, a social-networking system 460, a third-party system 470, and a network 410. As an example and not by way of limitation, two or more of a user 401, a client system 430, a social-networking system 460, and a third-party system 470 may be connected to each other directly, bypassing a network 410. As another example, two or more of a client system 430, a social-networking system 460, and a third-party system 470 may be physically or logically co-located with each other in whole or in part. Moreover, although FIG. 4 illustrates a particular number of users 401, client systems 430, social-networking systems 460, third-party systems 470, and networks 410, this disclosure contemplates any suitable number of client systems 430, social-networking systems 460, third-party systems 470, and networks 410. As an example and not by way of limitation, network environment 400 may include multiple users 401, client systems 430, social-networking systems 460, third-party systems 470, and networks 410.

This disclosure contemplates any suitable network 410. As an example and not by way of limitation, one or more portions of a network 410 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 410 may include one or more networks 410.

Links 450 may connect a client system 430, a social-networking system 460, and a third-party system 470 to a communication network 410 or to each other. This disclosure contemplates any suitable links 450. In particular embodiments, one or more links 450 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 450 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 450, or a combination of two or more such links 450. Links 450 need not necessarily be the same throughout a network environment 400. One or more first links 450 may differ in one or more respects from one or more second links 450.

In particular embodiments, a client system 430 may be an electronic device including hardware, software, or embedded logic components or a combination of two or more such components and capable of carrying out the appropriate functionalities implemented or supported by a client system 430. As an example and not by way of limitation, a client system 430 may include a computer system such as a desktop computer, notebook or laptop computer, netbook, a tablet computer, e-book reader, GPS device, camera, personal digital assistant (PDA), handheld electronic device, cellular telephone, smartphone, virtual reality headset and controllers, other suitable electronic device, or any suitable combination thereof. This disclosure contemplates any suitable client systems 430. A client system 430 may enable a network user at a client system 430 to access a network 410. A client system 430 may enable its user to communicate with other users at other client systems 430. A client system 430 may generate a virtual reality environment for a user to interact with content.

In particular embodiments, a client system 430 may include a virtual reality (or augmented reality) headset 432, such as OCULUS RIFT and the like, and virtual reality input device(s) 434, such as a virtual reality controller. A user at a client system 430 may wear the virtual reality headset 432 and use the virtual reality input device(s) to interact with a virtual reality environment 436 generated by the virtual reality headset 432. Although not shown, a client system 430 may also include a separate processing computer and/or any other component of a virtual reality system. A virtual reality headset 432 may generate a virtual reality environment 436, which may include system content 438 (including but not limited to the operating system), such as software or firmware updates and also include third-party content 440, such as content from applications or dynamically downloaded from the Internet (e.g., web page content). A virtual reality headset 432 may include sensor(s) 442, such as accelerometers, gyroscopes, magnetometers to generate sensor data that tracks the location of the headset device 432. The headset 432 may also include eye trackers for tracking the position of the user's eyes or their viewing directions. The client system may use data from the sensor(s) 442 to determine velocity, orientation, and gravitation forces with respect to the headset. Virtual reality input device(s) 434 may include sensor(s) 444, such as accelerometers, gyroscopes, magnetometers, and touch sensors to generate sensor data that tracks the location of the input device 434 and the positions of the user's fingers. The client system 430 may make use of outside-in tracking, in which a tracking camera (not shown) is placed external to the virtual reality headset 432 and within the line of sight of the virtual reality headset 432. In outside-in tracking, the tracking camera may track the location of the virtual reality headset 432 (e.g., by tracking one or more infrared LED markers on the virtual reality headset 432). Alternatively or additionally, the client system 430 may make use of inside-out tracking, in which a tracking camera (not shown) may be placed on or within the virtual reality headset 432 itself. In inside-out tracking, the tracking camera may capture images around it in the real world and may use the changing perspectives of the real world to determine its own position in space.

Third-party content 440 may include a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at a client system 430 may enter a Uniform Resource Locator (URL) or other address directing a web browser to a particular server (such as server 462, or a server associated with a third-party system 470), and the web browser may generate a Hyper Text Transfer Protocol (HTTP) request and communicate the HTTP request to server. The server may accept the HTTP request and communicate to a client system 430 one or more Hyper Text Markup Language (HTML) files responsive to the HTTP request. The client system 430 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web interface encompasses one or more corresponding source files (which a browser may use to render the web interface) and vice versa, where appropriate.

In particular embodiments, the social-networking system 460 may be a network-addressable computing system that can host an online social network. The social-networking system 460 may generate, store, receive, and send social-networking data, such as, for example, user-profile data, concept-profile data, social-graph information, or other suitable data related to the online social network. The social-networking system 460 may be accessed by the other components of network environment 400 either directly or via a network 410. As an example and not by way of limitation, a client system 430 may access the social-networking system 460 using a web browser of a third-party content 440, or a native application associated with the social-networking system 460 (e.g., a mobile social-networking application, a messaging application, another suitable application, or any combination thereof) either directly or via a network 410. In particular embodiments, the social-networking system 460 may include one or more servers 462. Each server 462 may be a unitary server or a distributed server spanning multiple computers or multiple datacenters. Servers 462 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 462 may include hardware, software, or embedded logic components or a combination of two or more such components for carrying out the appropriate functionalities implemented or supported by server 462. In particular embodiments, the social-networking system 460 may include one or more data stores 464. Data stores 464 may be used to store various types of information. In particular embodiments, the information stored in data stores 464 may be organized according to specific data structures. In particular embodiments, each data store 464 may be a relational, columnar, correlation, or other suitable database. Although this disclosure describes or illustrates particular types of databases, this disclosure contemplates any suitable types of databases. Particular embodiments may provide interfaces that enable a client system 430, a social-networking system 460, or a third-party system 470 to manage, retrieve, modify, add, or delete, the information stored in data store 464.

In particular embodiments, the social-networking system 460 may store one or more social graphs in one or more data stores 464. In particular embodiments, a social graph may include multiple nodes—which may include multiple user nodes (each corresponding to a particular user) or multiple concept nodes (each corresponding to a particular concept)—and multiple edges connecting the nodes. The social-networking system 460 may provide users of the online social network the ability to communicate and interact with other users. In particular embodiments, users may join the online social network via the social-networking system 460 and then add connections (e.g., relationships) to a number of other users of the social-networking system 460 whom they want to be connected to. Herein, the term "friend" may refer to any other user of the social-networking system 460 with whom a user has formed a connection, association, or relationship via the social-networking system 460.

In particular embodiments, the social-networking system 460 may provide users with the ability to take actions on various types of items or objects, supported by the social-networking system 460. As an example and not by way of limitation, the items and objects may include groups or social networks to which users of the social-networking system 460 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 460 or by an external system of a third-party system 470, which is separate from the social-networking system 460 and coupled to the social-networking system 460 via a network 410.

In particular embodiments, the social-networking system 460 may be capable of linking a variety of entities. As an example and not by way of limitation, the social-networking system 460 may enable users to interact with each other as well as receive content from third-party systems 470 or other entities, or to allow users to interact with these entities through an application programming interfaces (API) or other communication channels.

In particular embodiments, a third-party system 470 may include one or more types of servers, one or more data stores, one or more interfaces, including but not limited to APIs, one or more web services, one or more content sources, one or more networks, or any other suitable components, e.g., that servers may communicate with. A third-party system 470 may be operated by a different entity from an entity operating the social-networking system 460. In particular embodiments, however, the social-networking system 460 and third-party systems 470 may operate in conjunction with each other to provide social-networking services to users of the social-networking system 460 or third-party systems 470. In this sense, the social-networking system 460 may provide a platform, or backbone, which other systems, such as third-party systems 470, may use to provide social-networking services and functionality to users across the Internet.

In particular embodiments, a third-party system 470 may include a third-party content object provider. A third-party content object provider may include one or more sources of content objects, which may be communicated to a client system 430. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 460 also includes user-generated content objects, which may enhance a user's interactions with the social-networking system 460. User-generated content may include anything a user can add, upload, send, or "post" to the social-networking system 460. As an example and not by way of limitation, a user communicates posts to the social-networking system 460 from a client system 430. Posts may include data such as status updates or other textual data, location information, photos, videos, links, music or other similar data or media. Content may also be added to the social-networking system 460 by a third-party through a "communication channel," such as a newsfeed or stream.

In particular embodiments, the social-networking system 460 may include a variety of servers, sub-systems, programs, modules, logs, and data stores. In particular embodiments, the social-networking system 460 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 460 may also include suitable components such as network interfaces, security mechanisms, load balancers, failover servers, management-and-network-operations consoles, other suitable components, or any suitable combination thereof. In particular embodiments, the social-networking system 460 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 460 to one or more client systems 430 or one or more third-party systems 470 via a network 410. The web server may include a mail server or other messaging functionality for receiving and routing messages between the social-networking system 460 and one or more client systems 430. An API-request server may allow a third-party system 470 to access information from the social-networking system 460 by calling one or more APIs. An action logger may be used to receive communications from a web server about a user's actions on or off the social-networking system 460. In conjunction with the action log, a third-party-content-object log may be maintained of user exposures to third-party-content objects. A notification controller may provide information regarding content objects to a client system 430. Information may be pushed to a client system 430 as notifications, or information may be pulled from a client system 430 responsive to a request received from a client system 430. Authorization servers may be used to enforce one or more privacy settings of the users of the social-networking system 460. A privacy setting of a user determines how particular information associated with a user can be shared. The authorization server may allow users to opt in to or opt out of having their actions logged by the social-networking system 460 or shared with other systems (e.g., a third-party system 470), such as, for example, by setting appropriate privacy settings. Third-party-content-object stores may be used to store content objects received from third parties, such as a third-party system 470. Location stores may be used for storing location information received from client systems 430 associated with users. Advertisement-pricing modules may combine social information, the current time, location information, or other suitable information to provide relevant advertisements, in the form of notifications, to a user.

Figure 5:
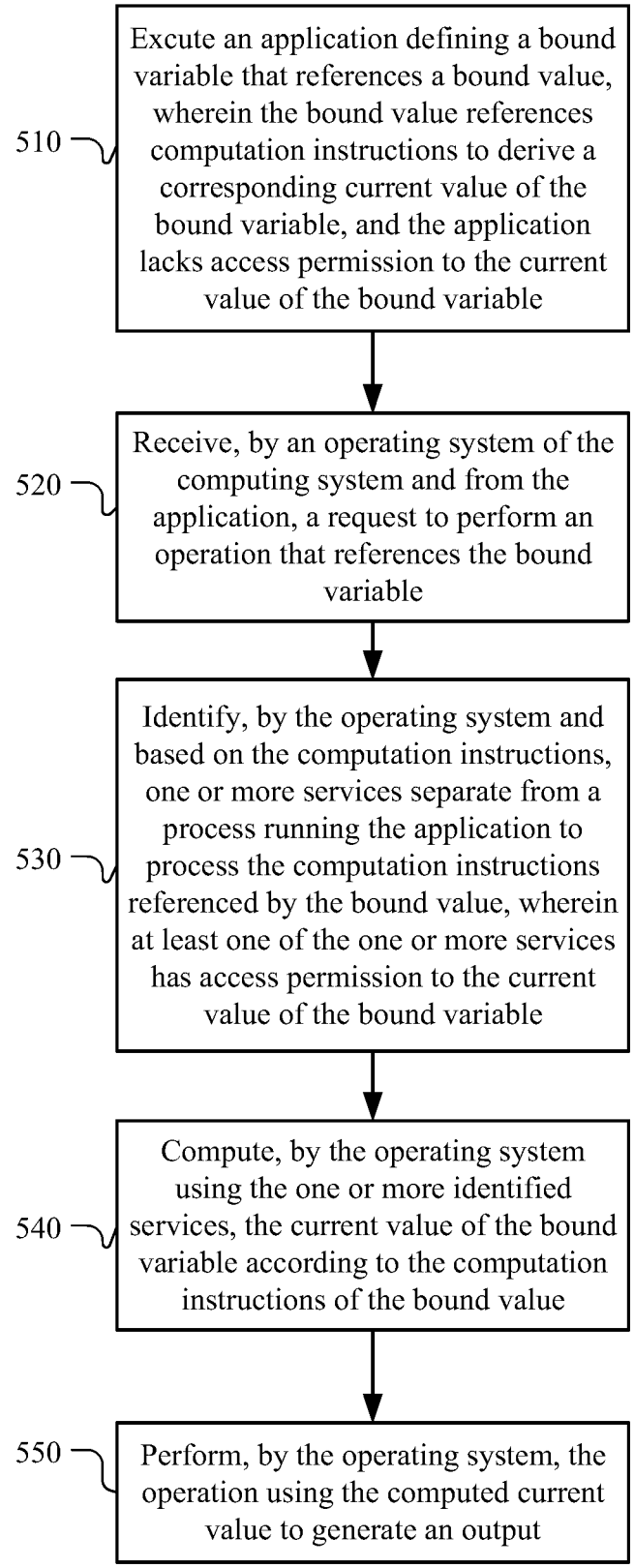
FIG. 5 illustrates an example method for utilizing an opaque bound variable.

FIG. 5 illustrates an example method 500 for utilizing an opaque bound variable. The method may begin at step 510, where a computing system (e.g., augmented reality system or virtual reality system) may execute an application defining a bound variable that references a bound value. In particular embodiments, the bound value may reference computation instructions to derive a corresponding current value of the bound variable. In particular embodiments, the application may lack access permission to the current value of the bound variable. At step 520, an operating system of the computing system may receive, from the application, a request to perform an operation that references the bound variable. At step 530, the operating system of the computing system may identify, based on the computation instructions, one or more services separate from a process running the application to process the computation instructions referenced by the bound value. In particular embodiments, at least one of the one or more services may have access permission to the current value of the bound variable. At step 540, the operating system of the computing system may compute, using the one or more identified services, the current value of the bound variable according to the computation instructions of the bound value. At step 550, the operating system of the computing system may perform the operation using the computed current value to generate an output. Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for utilizing an opaque bound variable, including the particular steps of the method of FIG. 5, this disclosure contemplates any suitable method of utilizing an opaque bound variable, including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6:
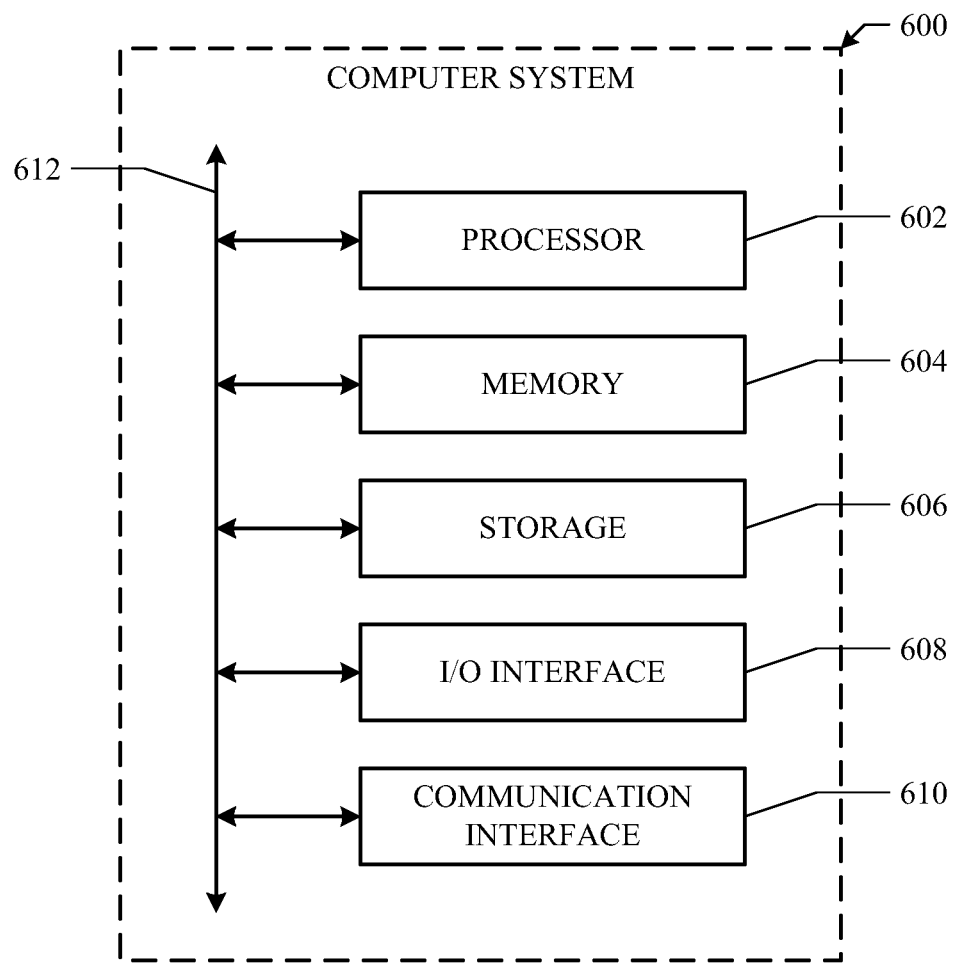
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
   executing an application defining a bound variable that references a bound value of the bound variable, wherein the bound variable is used to perform, by the computing system, a respective operation, wherein the bound value references computation instructions to derive a corresponding current value of the bound value, and wherein the application lacks access permission to the current value of the bound variable;

receiving, by an operating system of the computing system and from the application, a request to perform the respective operation that references the bound variable defined by the application;

identifying, by the operating system executing a first portion of the computation instructions referenced by the bound value, one or more services separate from a process running the application, wherein at least one of the one or more services has access permission to the current value of the bound variable;

using, by the operating system, the one or more identified services, to compute the current value of the bound variable by executing a second portion of the computation instructions referenced by the bound value; and performing, by the operating system, the respective operation using the computed current value to generate an output.

2. The method of claim 1, wherein the output is one or more of a visual output or an audio output.

3. The method of claim 1, further comprising:
presenting the output via one or more of a display of the computing system or one or more speakers of the computing system.

4. The method of claim 1, wherein the bound value is one of a plurality of data types, and wherein the plurality of data types comprises one or more of a scalar, struct, enum, option, set, ordered set, map, multimap, ordered map, ordered multimap, list, indexed set, or data set.

5. The method of claim 1, wherein the respective operation is performed in accordance with a particular snapshot associated with the bound variable, wherein the particular snapshot is a value of the bound value at a particular instance, and the particular snapshot has an associated particular snapshot identifier corresponding to the particular instance, wherein computing the current value comprises retrieving the associated particular snapshot identifier.

6. The method of claim 5, further comprising:
initializing a snapshot tracker for tracking a history of values of the bound value; and
in response to receiving an update to the bound value, adding to the snapshot tracker the update in the bound value and indexing the added update to the bound value using the associated particular snapshot identifier.

7. The method of claim 1, wherein the application further defines a terminating bound value that references other computation instructions for deriving a runtime value from at least the bound value of the bound variable.

8. The method of claim 1, wherein the application further defines one or more additional bound variables that each references a respective bound value of one or more additional bound values, wherein each of the additional bound values (1) is to perform, by the computing system, a respective operation, (2) can vary to reach a limiting bound value, (3) separates out what data, in a data store, the application has access to and (4) references computational instructions to derive a respective current value of the one or more additional bound variables.

9. The method of claim 8, wherein the operation further references the one or more additional bound variables, and wherein the one or more services are further identified to process the computation instructions referenced by the one or more additional bound variables.

10. The method of claim 1, wherein each of the one or more services has a first privilege level different from a second privilege level of the application, and wherein the first privilege level provides permission to access the current value of the bound variable.

11. The method of claim 1, wherein the one or more services comprises one or more of a user identifier, a social graph, and a chronological service.

12. The method of claim 1, wherein the computed current value comprises one or more of a user identification, a social connection between a first user and a second user, and time-related data.

13. One or more computer-readable non-transitory storage media embodying software that is operable when executed to:
execute an application defining a bound variable that references a bound value, wherein the bound variable is used to perform, by the computing system, a respective operation, wherein the bound value references computation instructions to derive a corresponding current value of the bound value, and wherein the application lacks access permission to the current value of the bound variable;

receive, by an operating system of a computing system and from the application, a request to perform the respective operation that references the bound variable defined by the application;

identify, by the operating system executing a first portion of the computation instructions referenced by the bound value, one or more services separate from a process running the application, wherein at least one of the one or more services has access permission to the current value of the bound variable;

using, by the operating system, the one or more identified services to compute the current value of the bound variable by executing a second portion of the computation instructions referenced by the bound value; and perform, by the operating system, the respective operation using the computed current value to generate an output.

14. The media of claim 13, wherein
the respective operation is performed in accordance with a particular snapshot associated with the bound variable, wherein the particular snapshot is a value of the bound value at a particular instance, and the particular snapshot has an associated particular snapshot identifier corresponding to the particular instance, wherein computing the current value comprises retrieving the associated particular snapshot identifier.

15. The media of claim 13, wherein computing the current value comprises retrieving a particular snapshot identifier, wherein the one or more computer-readable non-transitory storage media embodies software that is further operable when executed to:
initialize a snapshot tracker for tracking a history of values of the bound value; and
in response to receiving an update to the bound value, add to the snapshot tracker the update in the bound value and index the added update to the bound value using a snapshot identifier.

16. A system comprising:
one or more processors; and
one or more computer-readable non-transitory storage media coupled to one or more of the processors and comprising instructions operable when executed by one or more of the processors cause the system to:
execute an application defining a bound variable that references a bound value, wherein the bound variable is used to perform, by the computing system, a respective operation, wherein the bound value references computation instructions to derive a corresponding current value of the bound value, and wherein the application lacks access permission to the current value of the bound variable;

receive, by an operating system of a computing system and from the application, a request to perform the respective operation that references the bound variable defined by the application;

identify, by the operating system executing a first portion of the computation instructions referenced by the bound value, one or more services separate from a process running the application, wherein at least one of the one or more services has access permission to the current value of the bound variable;

using, by the operating system, the one or more identified services to compute the current value of the bound variable by executing a second portion of the computation instructions referenced by the bound variable; and perform, by the operating system, the respective operation using the computed current value to generate an output.

17. The system of claim 16, wherein the respective operation is performed in accordance with a particular snapshot associated with the bound variable, wherein the particular snapshot is a value of the bound value at a particular instance, and the particular snapshot has an associated particular snapshot identifier corresponding to the particular instance, wherein computing the current value comprises retrieving the associated particular snapshot identifier.

18. The system of claim 16, wherein computing the current value comprises retrieving a particular snapshot identifier, wherein the one or more computer-readable non-transitory storage media embodies software that is further operable when executed to:

initialize a snapshot tracker for tracking a history of values of the bound value; and in response to receiving an update to the bound value, add to the snapshot tracker the update in the bound value and index the added update to the bound value using a snapshot identifier.

19. The system of claim 16, wherein the application further defines a terminating bound value that references other computation instructions for deriving a runtime value from at least the bound value of the bound variable.

20. The system of claim 16, wherein each of the one or more services has a first privilege level different from a second privilege level of the application, and wherein the first privilege level provides permission to access the current value of the bound variable.

* * * * *